US012165454B2

(12) United States Patent
Boriskin

(10) Patent No.: US 12,165,454 B2
(45) Date of Patent: Dec. 10, 2024

(54) ACCESS REQUEST MODE FOR ACCESS CONTROL DEVICES

(71) Applicant: Sargent Manufacturing Company, New Haven, CT (US)

(72) Inventor: Peter Boriskin, New Haven, CT (US)

(73) Assignee: Sargent Manufacturing Company, New Haven, CT (US)

( * ) Notice: Subject to any disclaimer, the term of this patent is extended or adjusted under 35 U.S.C. 154(b) by 0 days.

(21) Appl. No.: 18/324,506

(22) Filed: May 26, 2023

(65) Prior Publication Data

US 2024/0005716 A1 Jan. 4, 2024

Related U.S. Application Data

(60) Provisional application No. 63/357,832, filed on Jul. 1, 2022.

(51) Int. Cl.
*G07C 9/22* (2020.01)
*G07C 9/28* (2020.01)

(52) U.S. Cl.
CPC .................................... *G07C 9/22* (2020.01); *G07C 9/28* (2020.01)

(58) Field of Classification Search
CPC .................................... G07C 9/22; G07C 9/28
USPC .......................................................... 235/382
See application file for complete search history.

(56) References Cited

U.S. PATENT DOCUMENTS 8,166,532 B2 4/2012 Chowdhury et al.
10,565,838 B2 2/2020 Horgan et al.
10,937,262 B2 3/2021 McLeod et al.
2005/0194437 A1* 9/2005 Dearing ............... G06Q 10/087 235/382
2007/0028119 A1 2/2007 Mirho
2007/0214493 A1 9/2007 Davis
2017/0228953 A1* 8/2017 Lupovici ............ G07C 9/00896
2019/0206159 A1* 7/2019 Benrachi .................. G07C 9/28
2019/0279445 A1* 9/2019 Gallagher ................ G07C 9/25
2021/0112064 A1 4/2021 Losseva et al.

OTHER PUBLICATIONS

[No Author Listed], E-Plex® 5800 Series Access Control System. Kaba, Beyond Security. 2013. 4 pages.
[No Author Listed], NetAXS®-123. Honeywell. Feb. 2018. 128 pages.

(Continued)

*Primary Examiner* — Michael G Lee
*Assistant Examiner* — David Tardif
(74) *Attorney, Agent, or Firm* — Wolf, Greenfield & Sacks, P.C.

(57) ABSTRACT

Techniques for controlling access to zones of a building. The techniques include determining with a computing device configured to regulate access to a zone of the building, at a time and responsive to a request to access the zone of the building received via an access control interface, whether a user is allowed to access the zone of the building; and in response to the computing device determining that the user is not allowed to access the zone at the time, receiving, via the access control interface, a request to permit access to the zone at the time; determining, with the computing device and at the time, whether to permit access to the zone based on one or more criteria; and outputting a result of determining whether to permit access to the zone.

19 Claims, 8 Drawing Sheets

(56) References Cited

OTHER PUBLICATIONS

Ritter et al., Access Control In BACnet®. Ashrae Journal. Nov. 1, 2006;48(11):B26.
Skandhakumar et al., Physical access control administration using building information models. Cyberspace Safety and Security: 4th International Symposium, CSS 2012, Melbourne, Australia. Dec. 2012.16 pages.
Wang et al., An automatic physical access control system based on hand vein biometric identification. IEEE Transactions on Consumer Electronics. Aug. 2015;61(3):320-7.

* cited by examiner

ACCESS REQUEST MODE FOR ACCESS CONTROL DEVICES

CROSS-REFERENCE TO RELATED APPLICATIONS

This application claims the benefit of priority under 35 U.S.C. 119(e) to U.S. Provisional Patent Application Ser. No. 63/357,832, filed Jul. 1, 2022, entitled "ACCESS REQUEST MODE FOR ACCESS CONTROL DEVICES", which is hereby incorporated by reference herein in its entirety.

BACKGROUND OF INVENTION

Access control systems may regulate access to a building. A user may present a credential (e.g., an access card) to a card reader installed at or near a door of the building. The reader communicates the credential's information to an access control server that determines whether to grant the user access to the door by matching the credential's information to data stored by the access control server.

BRIEF SUMMARY OF INVENTION

Some embodiments provide for a method for controlling access to zones of a building. The method comprises: determining with a computing device configured to regulate access to a zone of the building, at a time and responsive to a request to access the zone of the building received via an access control interface, whether a user is allowed to access the zone of the building; and in response to the computing device determining that the user is not allowed to access the zone at the time: receiving, via the access control interface, a request to permit access to the zone at the time; determining, with the computing device and at the time, whether to permit access to the zone based on one or more criteria; and outputting a result of determining whether to permit access to the zone.

Some embodiments provide for a system for controlling access to zones of a building. The system comprises: at least one computing device configured to regulate access to a zone of the building, the at least one computing device comprising at least one processor and computer-readable instructions that, when executed by the at least one processor, cause the at least one processor to perform a method. The method comprises: determining, at a time and responsive to a request to access a zone of the building received via an access control interface, whether a user is allowed to access the zone of the building; and in response to determining that the user is not allowed to access the zone at the time: receiving, via the access control interface, a request to permit access to the zone at the time; determining, at the time, whether to permit access to the zone based on one or more criteria; and outputting a result of determining whether to permit access to the zone.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear

DETAILED DESCRIPTION OF INVENTION

Figure 1:
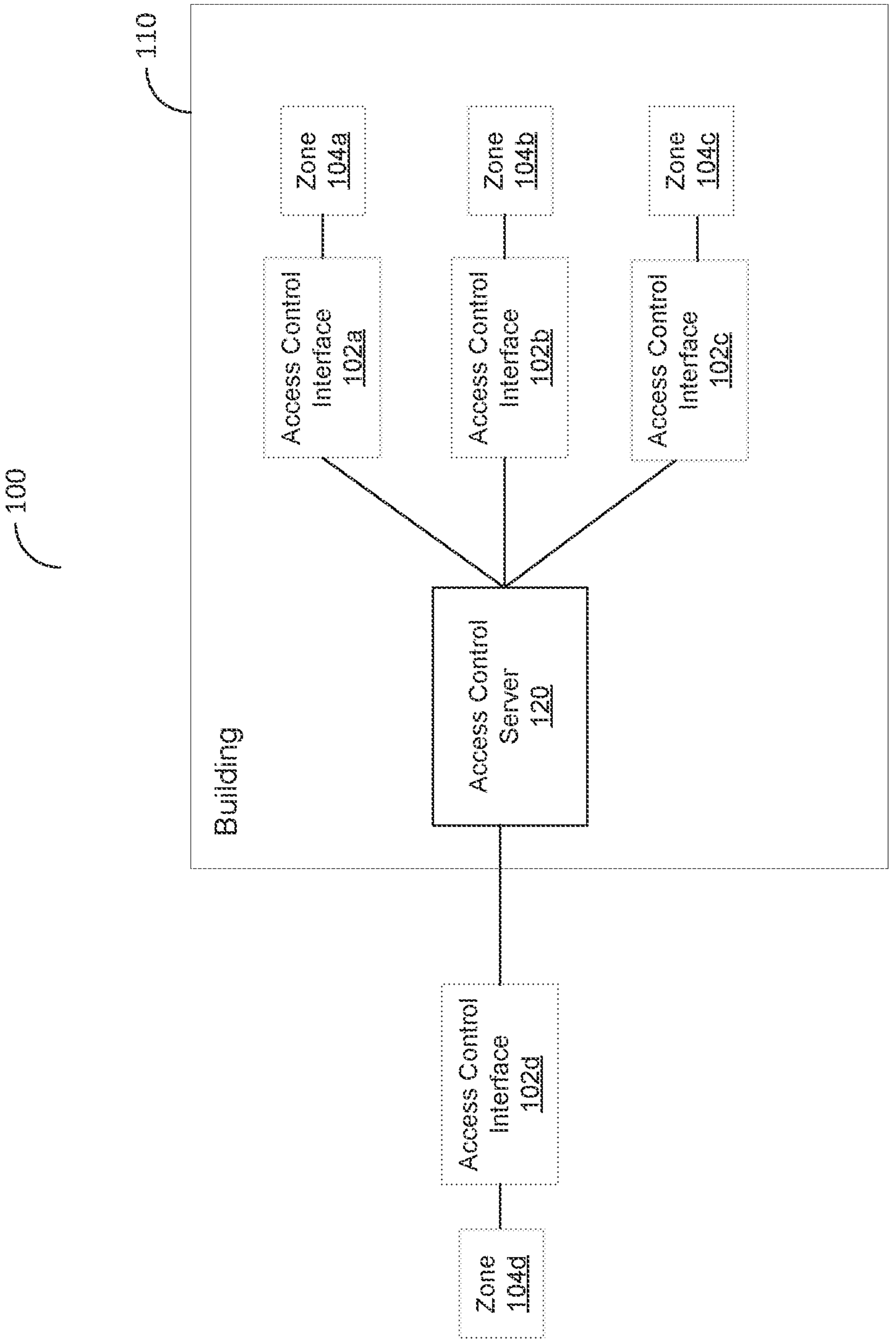
FIG. 1 is an example access control system with which some embodiments of the technology described herein may operate.

Described herein are embodiments of an electronic access control system that mitigates security risks associated with conventional approaches to access control while enabling free and secure flow of traffic between zones of a building or other area. Some access control systems described herein include a computing device (e.g., a server) that is configured to communicate with one or more access control interfaces that may be used to request access to the zones. In some embodiments, the access control computing device may determine, at a time and responsive to a request to access the zone of the building received via the access control interface, whether a user is allowed to access the zone of the building. The computing device may determine that the user is not allowed to access that zone at that time, but the process does not end there. The computing device may then receive from the user, such as following the user being informed that access is not allowed, a request to permit the user access to the zone via the access control interface. For example, the access control interface may include or otherwise present the user an option to request permission to access the zone when the initial determination resulted in the user being denied access to the zone. Selection of the option to request permission to access the zone may trigger the access control interface to communicate a request to permit access the zone to the computing device. The computing device may then, at the time, determine whether to permit access to the zone based on one or more criteria, and output a result of determining whether to permit access to the zone. If the determination is made to permit access to the zone at the time, then the user is granted access, despite the initial denial of access.

Electronic access control systems can be used to regulate user access to various physical spaces of a building, such as offices, equipment rooms, high-security areas, etc. Electronic access control systems are typically configured with policies that enable smooth flow of traffic around the building, e.g., users entering and exiting spaces as they go about their daily work. Under this model, for example, all employees of a business may be permitted access to all areas of that business' office. Or an employee may be permitted access to all areas at a certain level of access or security, even if in the normal course of business the employee may not expect to ever access one or more of those areas. This type of "overpermissioning" of access is typically done to enable employees to work without encountering obstacles, and thus avoid security becoming a hindrance to employees performing their tasks. While overpermissioning may have user-friendliness benefits, security administrators have known that it exposes a secured area to security risks, such as unauthorized access to a space or contents of the space, intrusion via tailgating and/or other risks.

Conventional approaches have been adopted to address overpermissioning risks, but do not sufficiently address the security concerns and raise other concerns. For example, some access control systems regulate access through the use of access control lists that specify a list of access allowances or access privileges for each user of an organization. These access control lists are manually created and updated by developers and system administrators of the organization. For large organizations with many employees, maintaining such access control lists can be tedious and time-consuming. For example, adding an entry in an access control list (for example, when a new employee joins the organization) or updating an existing entry in the access control list (for example, when access allowances for an existing employee need to be changed) may be performed manually by a system administrator managing the access control system. Manual maintenance of access control lists is not only time-consuming but also error prone. For example, a system administrator may create an incorrect entry in the access control list, which may result in access being granted to an unauthorized person. Also, a system administrator may still be tempted configure the access control lists to be overinclusive to ensure smooth access control operation resulting in overpermissioning access privileges to users of the organization.

Rather than using access control lists, some access control systems consider membership status or role/title of a user when determining whether to allow or deny access spaces of a building. For example, a first user with a "manager" role may be allowed access to a first set of spaces of the building whereas a second user with an "engineer" role may be allowed access to a second set of spaces of the building. The first set of spaces may be different than the second set of spaces, where the first set may include a larger number of spaces than the second set solely because of the role of the first user. Access control systems that regulate access based on roles are also managed manually by system administrators and suffer from the same drawbacks as access control systems using access control lists. In addition, these access control systems also result in overpermissioning access privileges to users of the organization.

In view of the above, the inventor has recognized and appreciated the advantages that would be offered by an access control system that regulates access at a finer scale, such as by making access decisions at an individual user and/or zone level, rather than overpermissioning access to all zones in the building or otherwise basing access decisions on aggregates, such as, roles or team memberships. More particularly, the inventors have recognized and appreciated the advantages that may be offered by systems that may have the usability advantages of a system with predetermined access rights and the security advantages of reduced or focused access rights (with respect to such predetermined access rights). Such systems may be made additionally usable and/or secure through techniques for, in response to determining that a user is not to be granted access to a zone at a time, responding to a request for access by determining whether the user is to be permitted to access the zone at the time.

Described herein are embodiments of an improved access control system that can mitigate challenges of conventional access control systems. The improved access control system of some embodiments described herein includes one or more access control interfaces associated with one or more zones of a building and an access control server configured to regulate access to the one or more zones. A user may initially be assigned a first set of primary access allowances (e.g., bare minimum access allowances or otherwise reduced or focused) specifying that a user is allowed to access one or more zones of the building. For example, the user may be assigned the first set of access allowances when the user first joins an organization. To gain access to a particular zone, the user may utilize the access control interface associated with the zone to request access to the zone. The access control interface may communicate the request to the access control server that may make determinations regarding whether the user is allowed to access the zone. The access control server may make such determinations based on the primary access allowances assigned to the user.

Overall security afforded by the access control system may be improved by initially assigning the user with the primary access allowances and updating the user's primary access allowances based on use of the system over time. Some embodiments described herein enable temporary and/or longer-term (e.g., permanent) updates to the user's primary access allowances by allowing users to request permission to access a zone at the access control interface and updating the user's primary access allowances based on determinations made by the access control server regarding whether to permit access to the zone at the time.

For instance, an access control server may respond to a request to access a zone by making an initial determination that the user is not allowed to access the zone (e.g., based on the primary access allowances) and may communicate a message to the access control interface. Such a determination may indicate that access is denied at the time. The access control interface may be configured to not only output a message indicating that access is not allowed at the time, but may also provide an option to the user request permission to access the zone at that time, in response to the access being denied, such as while the user is still at the entrance to the zone and still seeking access at the time. The user's selection of the option to request permission to access the zone at the time may trigger the access control interface to communicate a request to the access control server to permit the user to access the zone at the time. The access control server may then make a new determination of whether to permit access to the zone, which may be based on criteria other than or in addition to the primary access allowances, such as, time of day or day of week when the request is received; recent or historical access behavior pattern of the user requesting access; identity, role or membership status of the user requesting access; characteristics of the zone or contents of the zone when the request is received, or other criterion examples discussed below. The determination may be made dynamically, at the time the user is seeking the access and while the user may still be present at the entrance to the zone and seeking the access. In some cases, the determination reached by the access control server may differ from the initial determination based on the primary access allowances and, for example, the user may be granted access where access was initially denied. The access control server may output a result of determining whether to permit access to the zone and, if the user is to be permitted access, the user may be granted access such as by a door or lock being actuated to enable the user to enter the zone. In some cases, the result may also be evaluated to determine whether to update the user's access allowances. The result may be evaluated as part of an auditing process.

Illustrative implementations of such techniques and systems are described below. It should be appreciated, however, that embodiments are not limited to operating in accordance with these examples. Other embodiments are possible FIG. 1 is an example access control system 100 with which some embodiments of the technology described herein may operate. Access control system 100 may regulate access to one or more zones 104*a*, 104*b*, 104*c*, 104*d* of a building 110. A reference to zone(s) 104 may be understood to generally refer to any one or more of the zones 104*a*, 104*b*, 104*c*, and 104*d*. A zone 104 of building 110 may include physical spaces inside the building, such as, equipment rooms, offices, and high-security areas, or outside or otherwise connected to the building, such as, parking lots and storage areas. A zone 104 may include one or more doors, for example, a conference room including multiple doors that could be used to enter the conference room.

Access control system 100 may include one or more access control interfaces 102*a*, 102*b*, 102*c*, 102*d* that may be associated with the one or more zones 104*a*, 104*b*, 104*c*, 104*d* of the building 110. A reference to access control interface(s) 102 may be understood to generally refer to any one or more of the access control interfaces 102*a*, 102*b*, 102*c*, and 102*d*. In some embodiments, each zone 104 may be associated with an access control interface 102. A user may request access to a zone 104 via a corresponding access control interface 102. In some embodiments, an access control interface 102 may be provided at each ingress and egress point of the zone. For example, an access control interface 102 may be provided at each door of multiple doors of a conference room.

Access control system 100 may include an access control server 120 that is configured to regulate access to the one or more zones 104. Access control server 120 may be configured to communicate with one or more access control interfaces 102 that may be used to request access to the zones 104. Access control server 120 may receive, at a time, a request to access a zone 104 via an access control interface 102 and determine whether a user requesting access is allowed to access the zone 104. Access control server 102 may make such a determination based on a first set of primary access allowances assigned to the user. The primary access allowances may include a bare minimum, or otherwise reduced or focused allowances previously assigned to the user, for example, when the user joins an organization, when the user's role/title in the organization changes, and/or at other times or for other reasons. These primary access allowances may specify which zones 104 the user is allowed to access and/or which doors associated with the zones the user is allowed to access. Having an allowance to access a zone includes allowances to access all the doors associated with the zone. The primary access allowances may be specified in the form of an access control list maintained at the access control server 120 or in a database (not shown) communicatively coupled to access control server 120.

In some embodiments, a result of the determination based on the primary access allowances assigned to the user may be communicated to access control interface 102. For example, a message indicating the result may be communicated to the access control interface 102. Access control interface 102 may include components that enable the result to be presented to the user visually or in other formats (e.g., via haptic or auditory feedback). In some embodiments, access control interface 102 may include a display via which the output may be presented to the user. For example, a message indicating the results (e.g., "Access Granted" or "Access Denied") may be presented via the display. In other embodiments, access control interface may include one or more color LED (light emitting diode) indicators that visually inform the user of the result. For example, a red light may indicate that access is denied whereas a green light may indicate that access is granted. In yet other embodiments, different forms of haptic feedback generated by the access control interface 102 may indicate whether access is granted or denied. In still other embodiments, different forms of auditory feedback (e.g., a first sound for denied access and a second different sound for granted access) generated by the access control interface may indicate whether access is granted or denied. It will be appreciated that one or more forms of feedback (visual, auditory, haptic and/or other forms) may be provided via the access control interface 102.

It should be appreciated that while an embodiment has been described in which the interface 102 communicates access requests to the server 120 and the server 120 makes this determination (based on primary access allowances) of whether to access is allowed, embodiments are not so limited. In some other embodiments, the access control server 120 may provide configuration data to one or more of the access control interfaces 102, or the access control interfaces 102 may be otherwise provided with configuration data, and the configuration data may include primary access allowances. In such a case, an access control interface 102 receiving a request from a user to access an area may make a determination of access based on primary access allowances without communicating with the access control server 120.

A result of the determination based on the primary access allowances assigned to the user may indicate that access is denied at the time. Access control server 120 may communicate a message indicating the denied access to access control interface 102. In response, access control interface 102 may provide an option to the user to request permission to access the zone at that time. For example, a display at the access control interface 102 may present a graphical user element (e.g., a button or other selectable element), which when selected by the user, may cause the access control interface 102 to communicate a new request to the access control server 120 to permit the user to access the zone at the time. In some embodiments, the access control interface may include a physical component, such as a button provided on a face of the interface's enclosure, which may be selected by the user to trigger the new request.

Access control server 120 may, in response to receiving the new request, make a new determination of whether to permit access to the zone 104, which may be based on criteria other than or in addition to the primary access allowances. Examples of such criteria are discussed in more detail below and may include factors such as, time of day or day of week when the request is received; recent or historical access behavior pattern of the user requesting access; identity, role or membership status of the user requesting access; characteristics of the zone or contents of the zone when the request is received, or other criterion. The determination may be made dynamically, at the time the user is seeking the access and while the user may still be present at the entrance to the zone 104 and seeking the access via the access control interface 102. In some cases, the determination reached by the access control server 120 may differ from the initial determination based on the primary access allowances and, for example, the user may be granted access where access was initially denied.

Access control server 120 may output a result of determining whether to permit access to the zone. In some embodiments, a result of the determination made based on the new request may be communicated to access control interface 102. Access control interface 102 may indicate the result by providing one or more forms of feedback (e.g., visual, auditory, haptic and/or other forms of feedback) as discussed herein.

In some embodiments, the result of determining whether to permit access to the zone may also be evaluated to determine whether to update the user's access allowances. For example, if the result indicates that the user may be granted access to zone 104 where such access was initially denied, a determination may be made to update the primary access allowances assigned to the user to include access to zone 104 such that when the user requests access to zone 104 at a later time (e.g., a subsequent visit to the zone), the user is allowed access to the zone 104 without having to trigger a request to permit access to the zone.

While an embodiment has been described in which the access control server 120 makes a subsequent determination, based on criteria, of whether to permit access to a zone following an initial denial of access, it should be appreciated that embodiments are not so limited. In some embodiments, rather than the access control server 120 using the criteria to make the determination of whether to permit access in response to the request, the access control interface 102 may be configured to make the determination for the zone 104 based on the criteria. Accordingly, unless indicated otherwise below, techniques that described in connection with an access control server making a determination of whether to permit access to a zone should be understood to describe techniques that may be performed instead by an access control interface suitably configured to analyze the criteria.

Figure 2A:
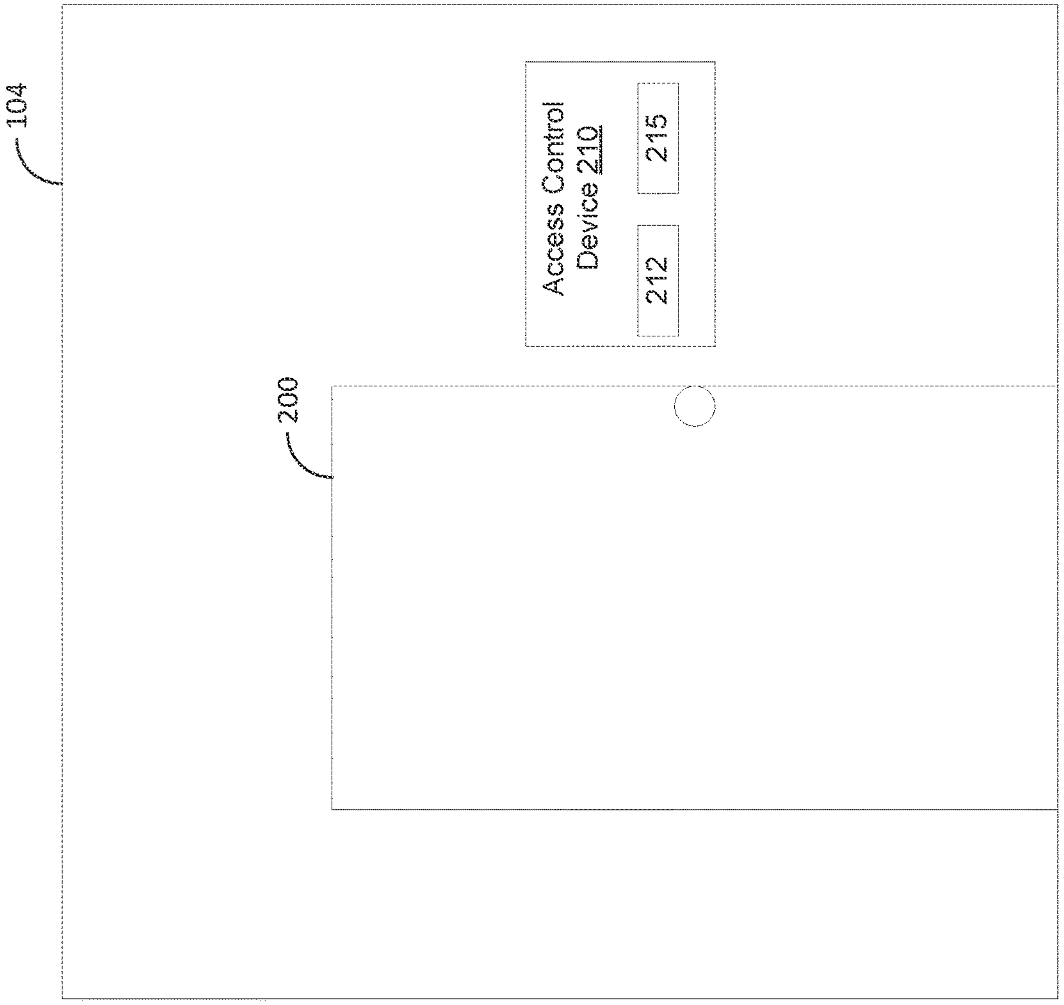
FIGS. 2A and 2B depict example access control interfaces with which some embodiments of the technology described herein may operate.

In some embodiments, the access control interface 102 may include an access control device 210 provided at ingress or egress points of zone 104. FIG. 2A depicts an example access control device 210 installed at or in proximity to an ingress point 200 (e.g., a door) of zone 104, such as on a wall next to the door. Examples of such access control devices may include card readers (e.g., proximity or smart card readers), key fob readers, biometric readers (e.g., devices capable of reading physiological or behavioral characteristics of a user, such as fingerprints, voice, facial or iris/retina related characteristics, etc.), keypad-based devices and/or other types of readers. Different types of access control devices may be configured to interact with, communicate with, and/or otherwise obtain information regarding different types of credentials. For example, a card reader may interact with or otherwise be configured to communicate with an access card or ID badge of a user. As another example, a key fob reader may interact with or otherwise be configured to communicate with a key fob of a user. As yet another example, a keypad entry device may be configured to obtain a user's PIN number via a keypad. As still another example, an NFC (near field communication) or Bluetooth enabled reader may be configured to communicate with a user's mobile device that functions as the user's credential. It will be appreciated that any type of access control device and any combination of access control devices may be utilized in the access control system 100 to request access to zones. For example, an access control device may include a combination of a key fob and biometric reader. It will be further appreciated that different types of access control devices configured to operate using different technologies (e.g., RFID, NFC, Bluetooth, or any other technology) may be utilized without departing from the scope of this disclosure.

In some embodiments, access control device 210 may include a display 212 configured to present information to a user requesting access. For example, display 212 may initially display a message requesting the user to swipe, scan, tap or otherwise present a user's credential to the access control device 210. In response, the access control device 210 may communicate a request to access the zone to access control server 120. The request may include the credential information. The access control server 120 may determine whether the user is allowed to access the zone based on the credential information. In some embodiments, the display 212 may be updated with a message indicating whether the user is allowed access to zone 104 (for example, in response to receiving a message from an access control server 120). Upon receiving an indication that access is denied, the display 212 may present a selectable graphical user interface element, such as a button, which when selected by the user, triggers the access control device 210 to communicate a request to permit access to access control server 120. In some embodiments, the request to permit access may be triggered via selection of a physical button 215 provided on the access control device 210. In some embodiments, in response to the request to permit access, access control server 120 may determine whether to permit access to zone 104 based on one or more criteria. Display 212 may be further updated with a message indicating whether the user is permitted to access zone 104 based on the result of the determination of whether to permit access.

For example, a user may, at a time, approach a door at an entrance of zone 104 and tap his card at a card reader installed near the door to gain access to the zone. In response to the tap, the card reader may communicate a request to access the zone to access control server 120. Access control server 120 may initially determine whether is user is allowed access to the zone and communicate a message indicating the result of this initial determination to the card reader. The card reader may display the message to the user. In response to receiving a message indicating that access is denied, the card reader may enable the user to dynamically request permission to access the zone while the user is still at the entrance and still seeking access at the time. The request to permit access may be received via a user selection of a graphical user interface button presented via the display or a physical button provided on the card reader. Selection of the button (graphical or physical) may trigger the card reader to communicate the request to permit access to access control server 120. Access control server 120 may determine at the time the user is seeking the access and while the user may still be present at the entrance, whether to permit access to the zone. Access control server 120 may output a result of determining whether to permit access to the zone to the card reader. In some cases, access control server 120 may determine that user may be granted access even though the result of the initial determination indicated that access is denied. The card reader may receive a message indicating the result of the determination of whether to permit access and display the message to the user. In some embodiments, in response to receiving a message indicating that access is permitted, the card reader may display the positive result via the display and output a control to the door or lock actuator to unlock or open the door.

Figure 2B:
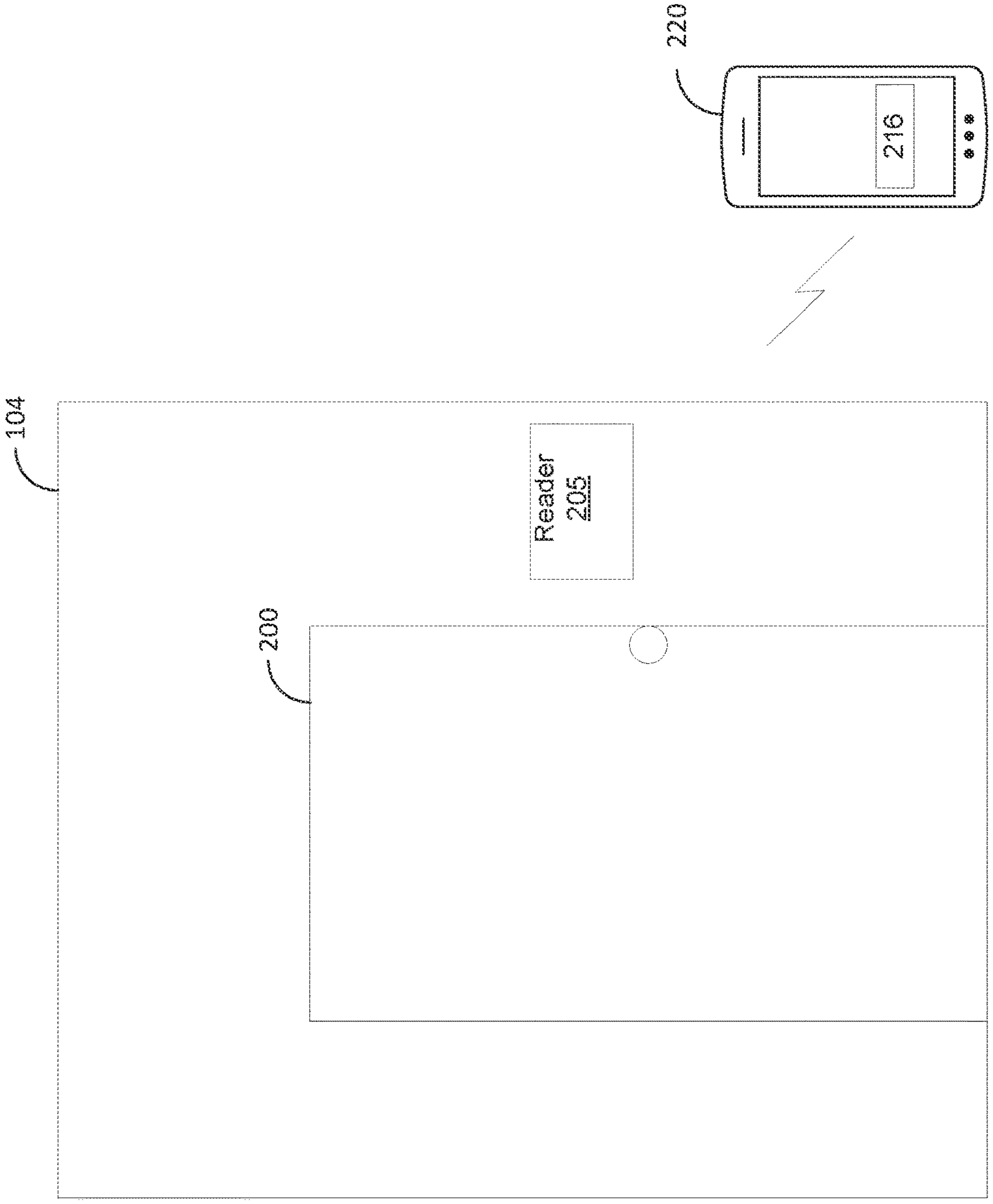

In some embodiments, access control interface 102 may include a mobile device 220 of a user requesting access to the zone 104. An example of such an embodiment is illustrated in FIG. 2B. The mobile device 220 may include an application that is configured to communicate with a reader 205 provided at or in proximity to ingress and/or egress points of the zone. The mobile device 220 may function as the user's credential. In some embodiments, a communication between the reader 205 and the mobile device 220 may be established when the mobile device 220 is in close proximity of the reader 205. The user's credential information stored at the mobile device 220 may be communicated to the reader 205 via the application using the established connection. The reader 205 may then communicate a request to access the zone to access control server 120. In some embodiments, the request may include the credential information. The access control server 120 may determine whether the user is allowed to access the zone based on the credential information and communicate a message indicating the result of the determination to the reader 205. The reader 205 may communicate the message to the application at the mobile device 220. The application may cause a display of the mobile device 220 to present the message to the user. In some situations when the message indicates that access is denied, the application may cause the display of the mobile device to present a selectable graphical user interface element, such as a button 216, which when selected by the user, triggers the application to communicate a request to permit access to the reader 205 that then communicates the request to the access control server 120.

For example, a user may, at a time, approach a door at an entrance of zone 104 with his mobile device 220. When the user is within a predetermined distance of the reader 205, a connection may be established between the application at the mobile device 220 and the reader 205 installed near the door. The reader 205 may read the user's credential information and communicate a request to access the zone to access control server 120. Access control server 120 may initially determine whether is user is allowed access to the zone and communicate a message indicating the result of this initial determination to the reader 205. The reader 205 may communicate the message to the application. The application may cause the message to be displayed to the user via a display. In response to receiving a message indicating that access is denied, the mobile device 220/ application at the mobile device 220 may enable the user to dynamically request permission to access the zone while the user is still at the entrance and still seeking access at the time. The request to permit access may be received via a user selection of a graphical user interface button presented via the display of the mobile device 220. Selection of the button may trigger the mobile device 220/application at the mobile device 220 to communicate the request to permit access to the reader 205 that may then communicate the request to the access control server 120. Access control server 120 may determine at the time the user is seeking the access and while the user may still be present at the entrance, whether to permit access to the zone. Access control server 120 may output a result of determining whether to permit access to the zone to the reader 205. In some cases, access control server 120 may determine that user may be granted access even though the result of the initial determination indicated that access is denied. The reader 205 may receive a message indicating the result of the determination of whether to permit access and communicate the message to the mobile device 220. In some embodiments, in response to receiving a message indicating that access is permitted, the mobile device 220 may display the positive result via the display and the reader 205 or the mobile device 220 may output a control to the door or lock actuator to unlock or open the door.

While FIGS. 2A and 2B depict an access control device/reader provided on a wall next to a door, it will be appreciated that the access control device/reader may be installed at the door, such as provided on a door lock at the door, or at any other location that allows a user to present credential(s) to the access control device/reader without departing from the scope of this disclosure.

Figure 3:
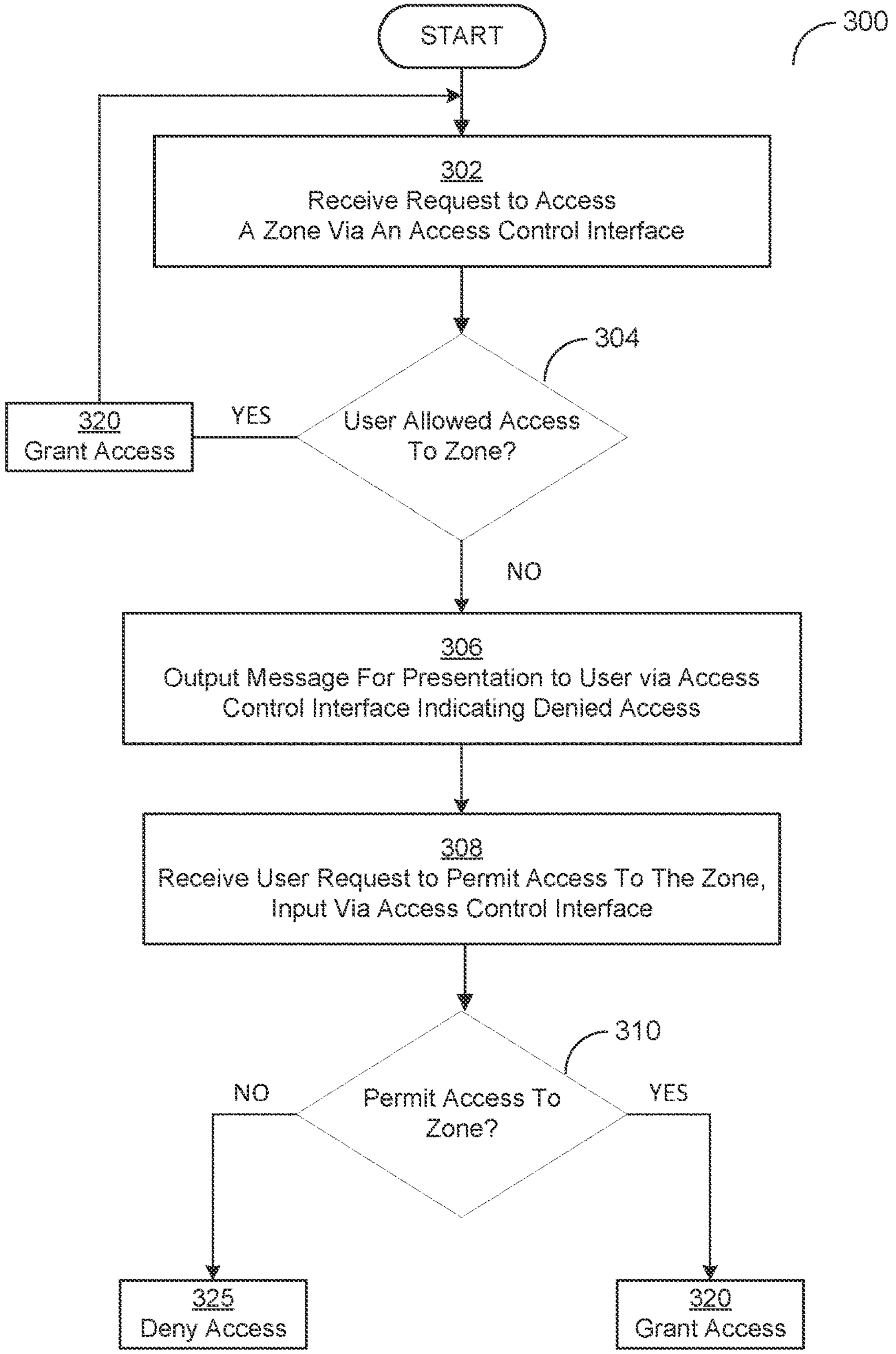
FIG. 3 is an example process performed by an access control server to enable a user to, following an initial denial of access to a zone at a time at an access control interface, dynamically request access to the zone at the time via the access control interface, according to some embodiments of the technology described herein.

FIG. 3 is an example process 300 performed by an access control server 120 to enable a user to, following an initial denial of access to a zone 104 at a time at an access control interface 102, dynamically request access to the zone 104 at the time via the access control interface 102, according to some embodiments of the technology described herein.

In act 302, access control server 12 may receive a request to access a zone 104*b*. The request may be received via an access control interface 102*b* associated with the zone 104*b*. In some embodiments, the access control interface 102*b* may include an access control device provided at an ingress/ egress point of the zone 104*b*. In some embodiments, the access control interface 102*b* may include a mobile device of the user requesting access, where the mobile device is configured to communicate with a reader provided at an ingress/egress point of the zone 104*b*.

In some embodiments, the request to access zone 104*b* may be received at a time, for example, when a user seeking access to the zone arrives at or approaches the zone and interacts with the access control interface 102*b*. The access control interface 102*b* may read the user's credential information and communicate the request to access the zone including the credential information to the access control server 120. The access control server 120 may receive this request including the credential information from the access control interface 102*b*.

At act 304, the access control server 120 may make a determination regarding whether the user is allowed access to the zone 104*b*. In some embodiments, this determination made based on whether the user was previously allowed access to zone 104*b* at a second time earlier than the time. For example, if the user was previously allowed access to zone 104*b* at the earlier time, a determination may be made that the user is allowed access to the zone 104 at the time. Similarly, if the user was previously not allowed access to zone 104*b* at the earlier time, a determination may be made that the user is not allowed access to the zone 104 at the time.

In some embodiments, the determination regarding whether the user is allowed access to zone 104 is made by evaluating the zone in connection with stored data indicating access allowances of the user. This data may be stored at the access control server 120 or in a database coupled to the access control server 120. In some embodiments, the data may be stored and maintained in the form of an access control list or other data structure indicating access permissions. A user may initially be assigned a set of primary access allowances (e.g., bare minimum access allowances or otherwise reduced or focused allowances) specifying that a user is allowed to access one or more zones 104 of the building. These primary set of access allowances may be assigned, for example, when the user first joins an organization.

In some embodiments, primary access allowances previously assigned to users of the access control system 100 may be maintained in the access control list. The access control list that may include entries that link users' credentials with information regarding zone(s) the users are allowed to access. For example, the access control list may include one or more entries for the user requesting access that may indicate that the user has access to zone 104*a* but does not have access to zone 104*b*.

In some embodiments, upon receiving the user's credential information from the access control interface 102*b*, the access control server 120 may determine whether the user is allowed access to zone 104*b* based on the received credential information and previously assigned primary access allowances for the user. In some embodiments, the access control server 120 may compare the credential information against the information in the access control list to determine whether the user is allowed to access zone 104*b*.

In some embodiments, the access control server 120 may respond to the request to access zone 104*b* by making, at act 304, an initial determination, at the time, that the user is allowed access to the zone (e.g., based on the primary access allowances) and may in act 320 output a message indicating "Grant Access" for presentation to user via access control interface 102*b*. In some embodiments, the access control server 120 may output in act 320 a control to a door or lock actuator associated with the zone to unlock or open the door. In other embodiments, upon receiving indication of the positive result from the access control server 120, the access control interface 102*a* may output the control.

In some embodiments, the access control server 120 may respond to the request to access zone 104*b* by making, at act 304, an initial determination, at the time, that the user is not allowed to access the zone (e.g., based on the primary access allowances) and may output a message indicating "Denied Access" for presentation to user via access control interface 102*b* in act 306. In some embodiments, the access control server 120 may communicate the message to access control interface 102*b*. The message may be communicated directly to the access control interface 102*b* in embodiments where the access control interface 102*b* comprises an access control device (e.g., access control device 210) and indirectly (e.g., via a reader, such as reader 205) in embodiments where the access control interface 102*b* comprises a mobile device.

In act 308, the access control server 120 may receive a request to permit access to the zone 104*b* at the time. The request may be received via the access control interface 102*b*. In some embodiments, the access control interface 102*b* may be configured to not only output the message indicating that access is not allowed at the time, but may also provide an option to the user to request permission to access the zone at that time, in response to the access being denied, such as while the user is still at the entrance to the zone and still seeking access at the time. In some embodiments, the option may be provided via a display associated with the access control interface 102*b*. For example, the option may be provided in the form of a selectable graphical user interface element. The user's selection of the option to request permission to access the zone 104*b* at the time may trigger the access control interface 102*b* to communicate a new request to the access control server 120 to permit the user to access the zone 104*b* at the time. The access control server 120 may receive this request to permit access to zone 104*b* from the access control interface 102*b*.

In act 310, the access control server 120 may make a new determination of whether to permit access to the zone, which may be based on criteria other than or in addition to the primary access allowances, such as, time of day or day of week when the request is received; recent or historical access behavior pattern of the user requesting access; identity, role or membership status of the user requesting access; characteristics of the zone or contents of the zone when the request is received, or other criterion. This determination may be made dynamically, at the time the user is seeking the access and while the user may still be present at the entrance to zone 104*b* and seeking the access. In some embodiments, this determination may be made locally at the access control server 120, or may be made by communicating with another system.

Figure 4:
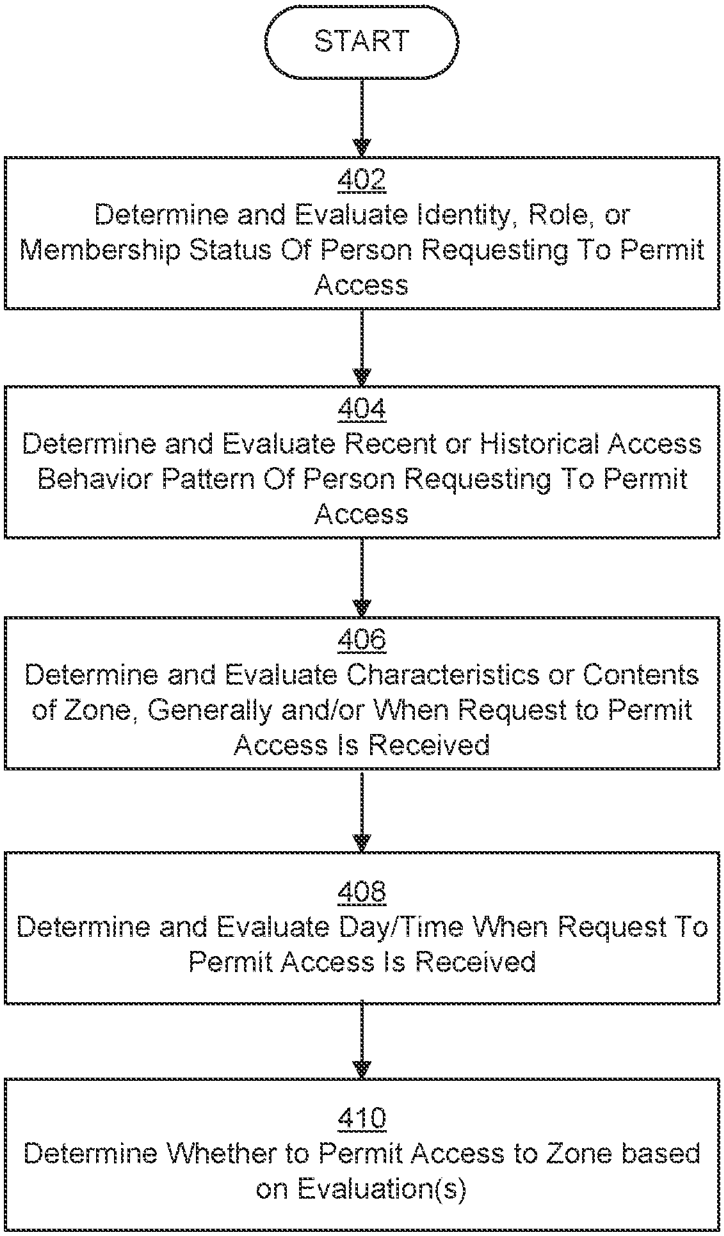
FIG. 4 depicts examples of criteria that may be used by the access control server to determine whether to permit access to a zone, according to some embodiments of the technology described herein.

In some embodiments, the access control server 120 may evaluate one or more criteria, individually or in combination, to determine whether to permit access to the zone. FIG. 4 depicts examples of criteria that may be used by the access control server 120 to determine whether to permit access to a zone, such as zone 104*b*, according to some embodiments of the technology described herein. While FIG. 4 illustrates multiple examples of such criteria, it should be appreciated that some embodiments may use any one or any combination of the criteria.

In act 402, the access control server 120 may determine and evaluate identity, role, or membership status of the user requesting access to determine whether to permit access to zone 104*b*. For example, when the user requesting access may be a high-ranking official of an organization, such as a chief operating officer, the access control server 120 may utilize the user's credential information to determine the role/title of the user and make a determination to permit the user access to zone 104*b* even though the initial determination based on the primary access allowances may have indicated that such access is not allowed.

In act 404, the access control server 120 may determine and evaluate recent or historical access behavior pattern of the user requesting access to determine whether to permit access to zone 104*b*. In some embodiments, the access control server 120 may log information regarding zones that the user has recently or historically accessed, such as types of zones accessed, times at which the zones were accessed, floors where the zones are located, and/or other information. This information may be utilized to determine whether to permit access to zone 104*b*. For example, zone 104*b* may be a server room. If the user's recent or historical access behavior pattern indicates that the user typically accesses or is granted access to other server/equipment rooms in an office, the access control server 120 may make a determination to permit the user access to zone 104*b* even though the initial determination based on the primary access allowances may have indicated that such access is not allowed. As another example, if the user does not typically access zones of the type for which access is being requested, or has never previously accessed the zone or zones of the type, a determination may be made not to permit access. As a further example, if the user has been recently accessing one or multiple zones that the user does not typically access, the user may be found to be deviating from historical access behaviors and thus may be found to be behaving differently than normal. Such different behaviors may raise security concerns. Accordingly, if the user is found to be accessing zone(s) in a manner different from an established behavior of the user, access to the zone may not be granted.

In act 406, the access control server 120 may determine and evaluate characteristics or contents of zone 104*b* to determine whether to permit access to zone 104*b*. In some embodiments, characteristics of a zone may dictate whether the access control server 120 permits access to the zone. For example, one zone may be designated as a high-security zone, such as an IT server room, indicating that only certain individuals may be permitted to access the zone whereas another zone may be designated as a lower-security zone, such as a conference room, where a larger number of individuals may be permitted access. In some embodiments, if zone 104*b* that the user is requesting access to is a high-security zone, the access control server 120 may make a determination to not permit access to zone 104*b*. In some embodiments, if zone 104*b* that the user is requesting access to is a lower-security zone, the access control server 120 may make a determination to permit access to zone 104*b* even though the initial determination based on the primary access allowances may have indicated that such access is not allowed.

In some embodiments, contents of a zone may dictate whether the access control server 120 permits access to the zone. For example, a zone may store highly sensitive data associated with the organization or may include equipment that is to be kept secured or individuals with high-security clearances. In some embodiments, if zone 104*b* that the user is requesting access to is such a zone, the access control server 120 may make a determination to not permit access to zone 104*b*. In some embodiments, the contents of the zone 104*b* may be determined dynamically at the time the access control server 120 is making the determination of whether to permit access to the zone 104*b*. If the contents of zone 104*b* do not otherwise include secure equipment or other content requiring high security, the access control server 120 may make a determination to permit access to zone 104*b*. Contents of a zone may be temporary or common contents for the zone. Accordingly, even if a zone commonly holds low-security items and does not commonly justify higher security, if the zone at a time holds people or objects that have higher security concerns, those temporary contents may inform access to the zone.

In act 408, the access control server 120 may determine and evaluate the day and time when the request to permit access is received to determine whether to permit access to zone 104*b*. For example, a request to permit access to zone 104*b* received during normal business hours on a weekday may be considered low risk and the access control server 120 may make a determination to permit access to zone 104*b*. On the other hand, a request to permit access to zone 104*b* received late at night during a weekend may be considered higher risk and the access control server 120 may make a determination to not permit access to zone 104*b*.

In act 410, the access control server 120 may determine whether to permit access to zone 104*b* based on one or more of the evaluations performed in acts 402, 404, 406, and 408. The determination may be made based on a combination of two or more of the evaluations performed in acts 402, 404, 406, and 408. The determination may be made based on a combination of criteria in any suitable manner. For example, if any criteria indicate that access is not to be granted, then access may not be granted. As another example, a determination may be made of a number of criteria weighing in favor of grant of access versus weighing against grant of access, and the decision with the larger number of supporting criteria may be chosen. As a further example, each of the criteria may be used to generate a numeric value, which may be an integer of 0 or 1 or another value between 0 and 1 determined using any suitable calculation for a criterion, and the numeric values may be combined in a mathematical operation. For example, the numeric values may be summed with a scaling value applied to each criterion. Once the calculation is performed, the result may be evaluated, such as by being compared to a threshold, and a determination may be made based on the evaluation.

The number and type of evaluations performed by the access control server 120 may not be limited to the ones depicted in FIG. 4. Other criteria may be utilized individually or in combination to the criteria depicted in FIG. 4. For example, access control server 120 may make a determination of whether to permit a user access to zone 104*b* based on characteristics of people in the zone 104*b*, near the zone 104*b*, or accompanying the user, when the user requests permission to access zone 104*b*. When the user is accompanied with a supervisor or the user's supervisor is already in zone 104*b*, the access control server 120 may make a determination to permit access to zone 104*b* even though the initial determination based on the primary access allowances associated with the user may have indicated that such access is not allowed.

In some embodiments, the access control interface 102 may be configured to communicate information regarding people entering and exiting a zone (e.g., identity, role/title, entry time, exit time, etc.) to the access control server 120 such that the access control server 120 can utilize this information to make determinations of whether to permit access to the zone. For example, access control interface 102*b* may read credential information associated with multiple users (e.g., the user requesting access to zone 104*b* and his supervisor) in close proximity of the access control interface 102*b* and communicate this information to access control server 120. The access control server 120 may utilize this information to determine whether to permit the user access to zone 104*b*.

Referring back to FIG. 3, at act 310, the access control server 120 may make a determination of whether to permit a user access to the zone based on one or more criteria (e.g., criteria described in reference to FIG. 4), the primary access allowances of the user, and/or a combination of the one or more criteria and the primary access allowances. In some embodiments, the access control server 120 may output a result of this determination to access control interface 102*b*.

In some embodiments, the access control server 120 may make a determination to permit access to zone 104*b* (i.e., grant access) in act 320. Granting access to zone 104*b* may include outputting a positive result to be displayed via the access control interface 102*b* and/or outputting a control to a door or lock actuator associated with zone 104*b* to unlock or open the door. The access control server 120 may not output the control in some embodiments and instead may output the result of the determination to the access control interface 102*b* and the access control interface 102*b* may then control the door or lock actuator. In embodiments where a zone may include multiple doors, a determination to permit access at one door of the zone may result in access being granted to all doors of the zone.

In some embodiments, the access control server 120 may output a message indicating "Grant Access" for presentation to the user via the access control interface 102*b*. In some embodiments, the access control server 120 may communicate the message to access control interface 102*b*. The message may be communicated directly to the access control interface 102*b* in embodiments where the access control interface 102*b* comprises an access control device (e.g., access control device 210) and indirectly (e.g., via a reader, such as reader 205) in embodiments where the access control interface 102*b* comprises a mobile device.

In some embodiments, the access control server 120 may make a determination to not permit access to zone 104*b* (i.e., deny access) in act 325. Denying access to zone 104*b* may include outputting a negative result ("Denied Access") to be displayed via the access control interface 102*b*. In embodiments where a zone may include multiple doors, a determination to deny access at one door of the zone may result in access being denied to all doors of the zone.

While the example of FIG. 3 has been discussed in connection with the user of the access control interface who is submitted the request for access being the person for which access is being sought, it should be appreciated that embodiments are not so limited. In some embodiments, a user of the access control interface may identify another person for whom access is sought and for which the determination is made.

Figure 5:
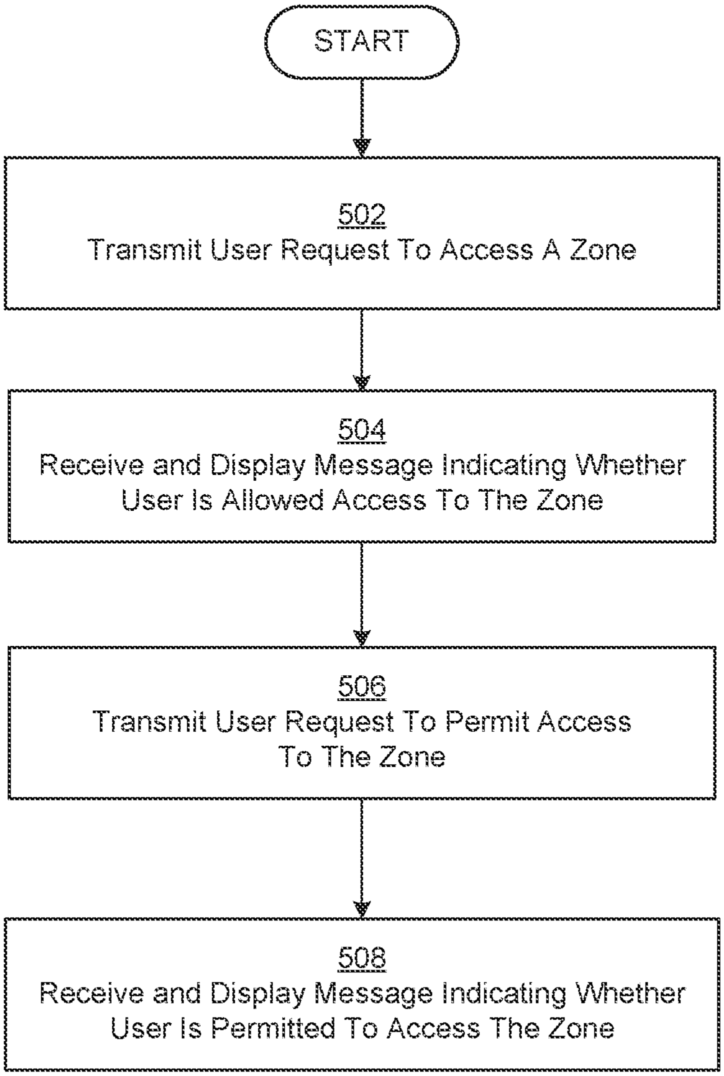
FIG. 5 is an example process performed by an access control interface to enable a user to dynamically request access to a zone following an initial denial of access, according to some embodiments of the technology described herein.

FIG. 5 is an example process performed by an access control interface 102 to enable a user to dynamically request access to a zone following an initial denial of access, according to some embodiments of the technology described herein. In act 502, the access control interface 102 may transmit a request to access a zone 104 to access control server 120. The request to access zone 104 may be received at a time, for example, when a user seeking access to the zone arrives at or approaches the zone and interacts with the access control interface 102. The access control interface 102 may read the user's credential information and communicate the request to access the zone including the credential information to the access control server 120.

The access control server 120 may make a determination regarding whether the user is allowed access to the zone at the time and may output the result of the determination to access control interface 102. In act 504, the access control interface 102 may receive a message indicating whether the user is allowed access to the zone and may display or otherwise present the message to the user. For example, if the user is granted access, a message "Grant Access" may be displayed at the access control interface 102. On the other hand, if the user is denied access, a message "Denied Access" may be displayed at the access control interface 102.

In some embodiments, the access control interface 102 may be configured to provide an option to the user to request permission to access the zone at the time, in response to the access being denied, such as while the user is still at the entrance to the zone and still seeking access at the time. In some embodiments, the option may be provided via a display associated with the access control interface 102*b*. For example, the option may be provided in the form of a selectable graphical user interface element.

At act 506, the access control interface 102 may transmit a new request to permit access to zone 104 to access control server 120. In some embodiments, the user's selection of the option to request permission to access the zone 104 at the time may trigger the access control interface 102 to communicate the new request to the access control server 120 to permit the user to access the zone 104 at the time. The access control server 120 may make a new determination of whether to permit access to the zone which may be based on criteria other than or in addition to the primary access allowances, such as, time of day or day of week when the request is received; recent or historical access behavior pattern of the user requesting access; identity, role or membership status of the user requesting access; characteristics of the zone or contents of the zone when the request is received, or other criterion. The access control server 120 may output the result of this new determination to access control interface 102.

In act 508, the access control interface 102 may receive a message indicating whether the user is allowed access to the zone and may display or otherwise present the message to the user. For example, if the user is granted access, a message "Grant Access" may be displayed at the access control interface 102. On the other hand, if the user is denied access, a message "Denied Access" may be displayed at the access control interface 102.

In some embodiments, in response to receiving a positive result from the access control server, the access control interface 102, in addition to displaying the "Grant Access" message, may output a control to a door or lock actuator associated with the zone 104 to unlock or open the door.

Figure 6:
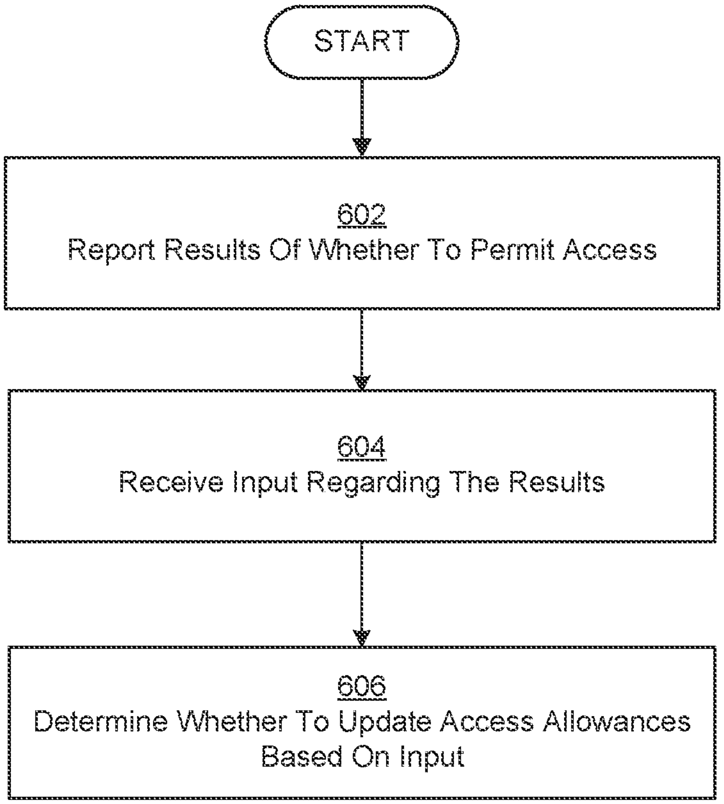
FIG. 6 is an example auditing process performed on information received from the access control server, according to some embodiments of the technology described herein.

In some embodiments, the result of the determinations made by the access control server, such as, the determination made regarding whether to permit access, may be evaluated to determine whether to update the user's access allowances. The result may be evaluated as part of an auditing process. FIG. 6 is an example auditing process performed on information received from the access control server, according to some embodiments of the technology described herein.

In act 602, the access control server 120 may report the results of whether to permit access to another entity, for example, a third-party auditing service or an administrator of the access control system 100. In some embodiments, the result may include a determination to not permit a user access to a zone, and the access control server 120 may output the result by notifying a second user different than the user of the result.

In some embodiments, the other entity may evaluate the results reported by the access control server 120. For example, a system administrator may evaluate the results to determine whether the access control server 120 made accurate determinations of whether to permit access. The system administrator may determine, in some instances, that the access control server 120 granted access to a user where such access should have been denied or the access control server 120 denied access to a user where such access should have been granted. The system administrator may generate input regarding the reported results. In some embodiments, if the access control server 120 made a determination to permit access to a user, the system administrator may provide feedback indicating whether this determination to permit access was accurate. Similarly, if the access control server 120 made a determination to deny access to a user, the system administrator may provide feedback indicating whether this determination to deny access was accurate.

In some embodiments, at act 604, the access control server 120 may receive input regarding the reported results. For example, the access control server 120 may receive feedback regarding the determinations made by the access control server 120. The access control server 120 may receive such feedback from a third-party auditing service or the system administrator.

At act 606, the access control server 120 may determine whether to update the primary access allowances assigned to the user based on the received input. For example, in response to feedback indicating that a determination to permit a user access to a zone was accurate, the access control server 120 may update the primary access allowances assigned to the user to include access to the zone. In some embodiments, updating the primary access allowances may include updating an access control list stored in the database coupled to the access control server 120.

Example Computing Device

Figure 7:
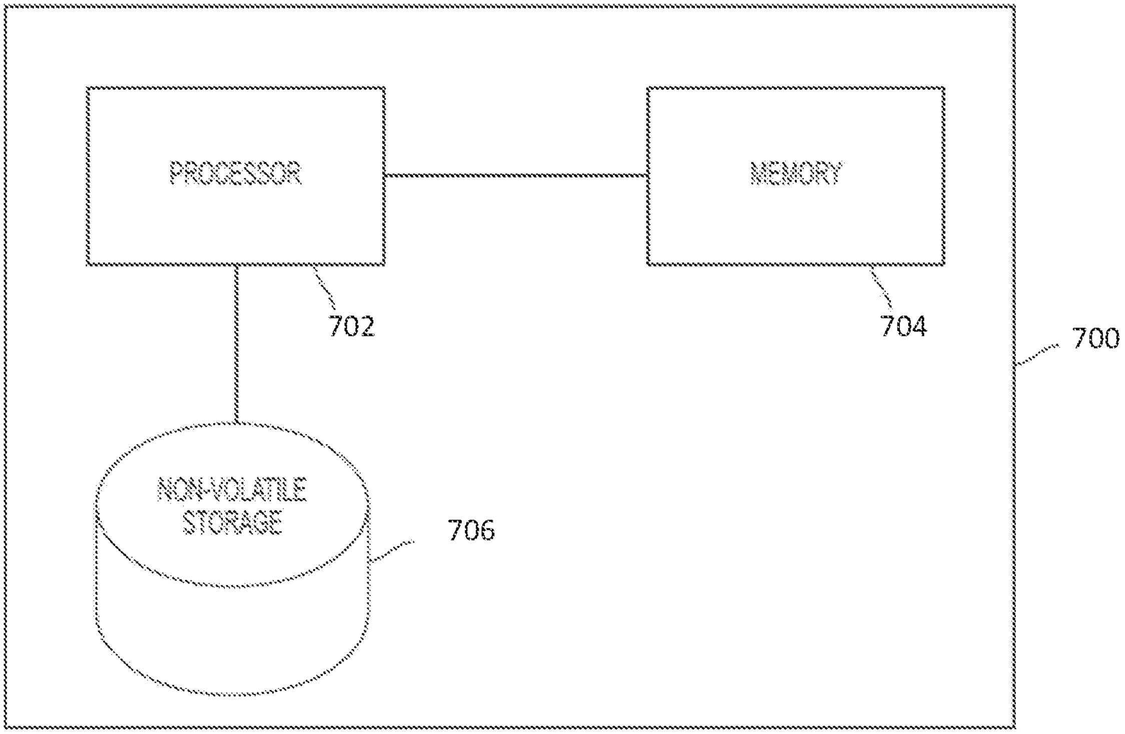
FIG. 7 is a block diagram of an example computer system, according to some embodiments of the technology described herein.

An illustrative implementation of a computing device 700 that may be used in connection with any of the embodiments of the disclosure provided herein is shown in FIG. 7. The computing device 700 may include one or more computer hardware processors 702 and one or more articles of manufacture that comprise non-transitory computer-readable storage media (e.g., memory 704 and one or more non-volatile storage devices 706). The processor 702(*s*) may control writing data to and reading data from the memory 704 and the non-volatile storage device(s) 706 in any suitable manner. To perform any of the functionality described herein, the processor(s) 702 may execute one or more processor-executable instructions stored in one or more non-transitory computer-readable storage media (e.g., the memory 704), which may serve as non-transitory computer-readable storage media storing processor-executable instructions for execution by the processor(s) 702.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For example, data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for controlling access to zones of a building, the method comprising:

determining with a computing device configured to regulate access to a zone of the building, at a time and responsive to a first request to access the zone of the building received via an access control interface, whether a user is allowed to access the zone of the building, wherein the first request is made by accessing the access control interface in a first manner; and in response to the computing device determining that the user is not allowed to access the zone at the time:

outputting a first indication via the access control interface indicating that the user is not allowed to access the zone;

receiving, via the access control interface, a second request to permit access to the zone at the time, wherein the second request is made by accessing the access control interface in a second manner different than the first manner;

determining, with the computing device and at the time, whether to permit access to the zone based on one or more criteria; and outputting a result of determining whether to permit access to the zone, wherein outputting the result comprises outputting a second indication via the access control interface indicating whether the user is permitted access to the zone.

2. The method of claim 1, wherein determining whether the user is allowed to access the zone at the time comprises:

determining whether the user is allowed to access the zone based on whether the user was previously allowed access to the zone at a second time earlier than the time.

3. The method of claim 1, wherein determining whether the user is allowed to access the zone at the time comprises:

determining whether the user is allowed to access the zone by evaluating the zone in connection with stored data indicating access allowances of the user.

4. The method of claim 1, wherein:

the zone comprises one or more doors, and receiving the second request to permit access to the zone comprises receiving a request to permit access to a door of the one or more doors.

5. The method of claim 4, wherein:

the access control interface comprises an access control device provided at the door, and receiving a request to permit access to the door comprises receiving, via the access control device provided at the door, the request to permit access to the door.

6. The method of claim 4, wherein:

the access control interface comprises a mobile device of the user, and receiving a request to permit access to the door comprises receiving, via the mobile device of the user, the request to permit access to the door.

7. The method of claim 1, wherein determining whether to permit access to the zone based on one or more criteria comprises determining whether to permit access to the zone based on an identity, role, or membership status of the user.

8. The method of claim 1, wherein determining whether to permit access to the zone based on one or more criteria comprises determining whether to permit access to the zone based on a recent or historical access behavior pattern associated with the user.

9. The method of claim 1, wherein determining whether to permit access to the zone based on one or more criteria comprises determining whether to permit access to the zone based on characteristics or contents of the zone.

10. The method of claim 1, wherein outputting the second indication comprises outputting a message to the access control interface provided at the zone.

11. The method of claim 1, wherein the result comprises a determination to not permit access to the zone, and outputting the result comprises notifying a second user different than the user of the result.

12. The method of claim 1, wherein:

receiving the second request to permit access to the zone at the time comprises receiving the second request to permit access in response to selection of an option to request permission to access the zone provided via the access control interface.

13. A system for controlling access to zones of a building, the system comprising:

at least one computing device configured to regulate access to a zone of the building, the at least one computing device comprising at least one processor and computer-readable instructions that, when executed by the at least one processor, cause the at least one processor to perform a method comprising:

determining, at a time and responsive to a first request to access a zone of the building received via an access control interface, whether a user is allowed to access the zone of the building, wherein the first request is made by accessing the access control interface in a first manner; and in response to determining that the user is not allowed to access the zone at the time:

outputting a first indication via the access control interface indicating that the user is not allowed to access the zone;

receiving, via the access control interface, a second request to permit access to the zone at the time, wherein the second request is made by accessing the access control interface in a second manner different than the first manner;

determining, at the time, whether to permit access to the zone based on one or more criteria; and outputting a result of determining whether to permit access to the zone, wherein outputting the result comprises outputting a second indication via the access control interface indicating whether the user is permitted access to the zone.

14. The system of claim 13, wherein:

the zone comprises one or more doors, and receiving the second request to permit access to the zone comprises receiving a request to permit access to a door of the one or more doors.

15. The system of claim 14, wherein:

the access control interface comprises an access control device provided at the door, and receiving a request to permit access to the door comprises receiving, via the access control device provided at the door, the request to permit access to the door.

16. The system of claim 14, wherein:

the access control interface comprises a mobile device of the user, and receiving a request to permit access to the door comprises receiving, via the mobile device of the user, the request to permit access to the door.

17. The system of claim 13, wherein determining whether to permit access to the zone based on one or more criteria comprises determining whether to permit access to the zone based on an identity, role, or membership status of the user.

18. The system of claim 13, wherein determining whether to permit access to the zone based on one or more criteria comprises determining whether to permit access to the zone based on a recent or historical access behavior pattern associated with the user.

19. The system of claim 13, wherein determining whether to permit access to the zone based on one or more criteria comprises determining whether to permit access to the zone based on characteristics or contents of the zone.

* * * * *